INVENTOR.
ELDRED C. NELSON
BY Henry Heyman
ATTORNEY

Feb. 28, 1956 E. C. NELSON 2,736,852
AUTOMATIC DIGITAL MOTOR CONTROL SYSTEM FOR MACHINE TOOLS
Filed Jan. 10, 1955 4 Sheets-Sheet 3

INVENTOR,
ELDRED C. NELSON
BY Henry Heyman
ATTORNEY

Feb. 28, 1956     E. C. NELSON     2,736,852
AUTOMATIC DIGITAL MOTOR CONTROL SYSTEM FOR MACHINE TOOLS
Filed Jan. 10, 1955     4 Sheets-Sheet 4
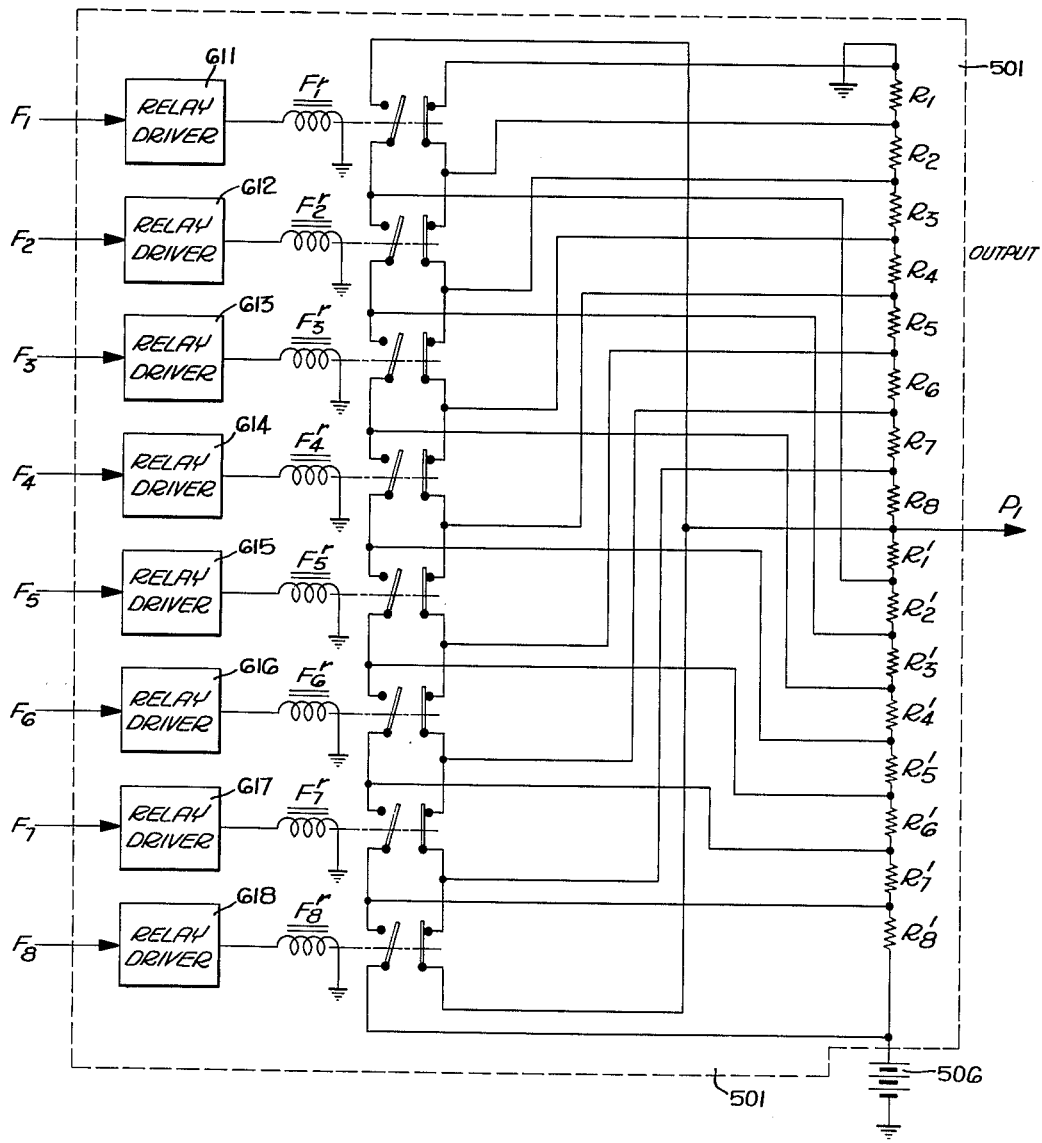
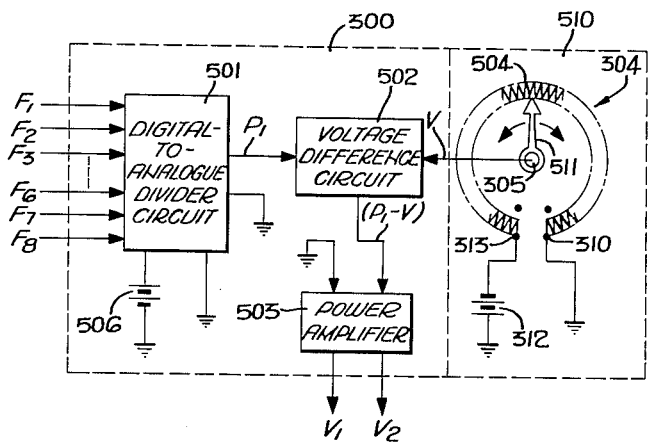
INVENTOR.
ELDRED C. NELSON
BY Henry Heyman
ATTORNEY

United States Patent Office 2,736,852
Patented Feb. 28, 1956

2,736,852

AUTOMATIC DIGITAL MOTOR CONTROL SYSTEM FOR MACHINE TOOLS

Eldred C. Nelson, Los Angeles, Calif.

Application January 10, 1955, Serial No. 480,836

19 Claims. (Cl. 318—162)

This invention relates to digital control systems for automatic machinery, and more particularly to a sequential electronic control system for automatically operating machine tools in response to groups of coded input instructions.

Several digital control systems have been proposed in the past. Typical systems are described on pages 114 and 115 of an article entitled "Digital computer controlled machine tool" by E. D. Gittens, in Electrical Manufacturing, August 1950 and on pages 133 through 137 of an article entitled "Numerically controlled milling machine" by A. K. Suskind, and co-workers in the Review of Input and Output Equipment Used in Computing Systems, March 1953.

In the digital control systems of the prior art, accuracy is achieved by utilizing a digital-servo feed-back loop for each controlled operation of a machine. Essentially such a feed-back loop utilizes an order register, a summing register or counter, a digital-to-analogue translation device and an analogue-to-digital converter. The digital information stored in the order register is converted by the digital-to-analogue translation device into an analogue control signal for controlling a motor or other servo mechanism of the automatic machine. As the machine performs an operation in response to the analogue control signals, the motion of the machine is translated by the analogue-to-digital converter into digital pulses or signals, these digital pulses being representative of the motion or position of the moving mechanism of the automatic machine. These digital pulses are returned to the summing register or counter for actuating the summing register to assume an "order complete" state, as determined by a comparison with the number shared in the order register, indicating that the desired operation by the moving mechanism of the machine has been performed. Thus the digital-servo feed-back loop includes a device for storing digital information representing the desired operations to be performed by the automatic machine, a device for translating the digital signals into analogue voltage signals for inducing the automatic machine to perform the function desired, and a device associated with the moving mechanisms of the machine for producing digital signals which are returned to the original source for comparison, thus closing the servo loop.

The circuit complexity inherent in these systems results from the fact that a direct digital control is not achieved in response to the digital orders originating from the register. Instead, the digital servo loop is interposed in each control circuit for purposes of increasing accuracy and determining the time-reference point at which a given order has been achieved and for readying the machine to perform a succeeding order.

Although considerable accuracy may be achieved with the above digital-servo loop system, the loop requires comparatively complex circuitry for converting the motion of the moving mechanisms of the machine into digital signals and interpreting these signals to determine the motion or position of the moving mechanisms at any instant. In many applications of machine tool operation, a lesser degree of accuracy than that possible by a digital-servo feed-back loop may be sufficient. For example, it is not uncommon for industrial large stock lathe and milling machines to hold a .001 inch or 1 mil tolerance.

It becomes desirable in contemplating the automatic operation of such machinery to consider a simpler digital electronic control system wherein an accuracy sufficient for such machinery may be achieved by an electronic digital control system of far less complexity than the digital-servo feed-back system of the prior art.

This may be more clearly understood by reference to an illustration of a particular type of machine tool. For example, it may be desired to automatically control a Brown and Sharpe automatic screw machine by a set of orders in digital signal form, wherein each order directs a certain operational function of the machine. Such a machine is described in "Construction and Use of Brown and Sharpe Automatic Screw Machines," published by Brown and Sharpe Manufacturing Company, Providence, R. I., 1953.

The Brown and Sharpe automatic screw machine is essentially a modified turret lathe designed to produce a large quantity of similar finished products. The machine is adapted to repetitively perform a series of operations during each operational cycle, each operational cycle resulting in the production of one of the finished products such as a screw. The machine includes a spindle for rotating the raw stock or work to be machined, and three cutting tool slides, a front-cross slide, a back-cross slide, and a turret slide. The front and back cross slides each hold a single cutting tool which is moved into the turning raw stock perpendicular to the axis of rotation of the spindle from the front and back, respectively, of the work. Mounted on the turret slide, is a six-position turret having five individual cutting tools and a "stock stop" tool located radially around the circumference of the turret. The turret is moved along a line that is an extension of the axis of rotation of the work. Consequently the turret cutting tools approach the work from its front edge and make tangential cuts; i. e., the line of cutting of each tool when it is in its cutting position is tangent to the cylindrical surface of the work and is perpendicular to the line of motion of the tool which is parallel to the axis of the spindle. The rough stock from which the desired products are to be produced is fed into the machine by a feed mechanism, which, when activated by a stock feed lever, opens a spring collet and shoves the stock through an axial opening in the spindle. The stock is fed until it strikes the stock stop, which is mounted in one of the turret positions. The collet then closes and grips the stock so that it may be rotated at the speed of the spindle.

The turret is rotated on its axis through ⅙ of a complete revolution upon each depression of a turret indexing level. Thus each turret tool is successively aligned in a cutting position when the turret index lever is successively depressed six times.

As each product is completed it is discarded from the collet into a basket by the action of a deflector mechanism, thus freeing the collet for feeding in the rough stock for the succeeding object. The deflector mechanism is set in motion by depressing a deflector trip lever accessible to the operator. In addition to the above, the machine is provided with a forward-reverse tripping lever which causes the direction of rotation of the spindle, and thus of the rough stock, to be reversed upon each depression of the lever.

The motion of each of the cutting tool slides, i. e., the turret slide, the front-cross slide, and the rear-cross slide, is controlled by an individual cam mounted on a common, rotating cam shaft geared to the main driving shaft of the machine. The function of the cams is to control accurately the relative time and velocity of motion of the slides in relation to the revolutions of the main drive shaft and thus, indirectly, the rotation of the spindle which is geared thereto. A set of three cams, one for each of the slides, is designed and machined for each "operational period" or set-up of the machine.

The operational period of a Brown and Sharpe machine is herein defined as the time or period utilized to produce an entire set or group of similar, machined products such as a particular screw. It is usually considered uneconomical to utilize this type of machine for producing only one or a few finished products after each set-up. The set-up operation is long and costly and justified only by producing several thousand pieces or finished products during each operational period. The major problem, involving the greatest precision, is the production of the three slide cams. Each cam must be designed and finished with great accuracy and results in the expenditure of considerable man-hours.

Aside from the time consuming task of producing the cams, the operation of the above referred to tripping levers during each operational cycle of an operational period is no mean task. Assuming that 20,000 objects are to be produced after one set-up or during a given operational period, the operator must control the machine through 20,000 operational cycles. This means that he must depress the stock feed, the turret index, and the deflector lever at least once during each operational cycle making a minimum total of 60,000 hand motions. In addition, it is highly probable that the turret may have to be indexed five or six times and the forward-reverse mechanism activated at least once during each operational cycle.

Automatic digital control means for performing the above operations would therefore be highly desirable. Particularly would it be desirable to eliminate the necessity of designing and machining the three slide operating cams. However, to automatically perform all the above functions of a Brown and Sharpe screw machine by digital-servo feed-back loops would obviously require circuitry of such complexity as to be prohibitive from any practical standpoint. Each of the operations performed by the machine during an operational cycle would require circuitry for translating the mechanical performance of the operation into digital signals in order to close the loop. In addition, each operation would require a separate register for receiving the digital signals converted from the mechanical operations of the machine and means for interpreting the quantities stored in the register in order to determine the state of performance of the corresponding operation.

Accordingly, it is an object of the present invention to provide a simple digital control system for automatically controlling machine tools.

It is another object of the present invention to provide a sequential digital control system for automatically controlling a machine tool wherein operations of the machine tool are controlled by a set of digital orders executed in a sequential manner, each operation of the machine being allotted sufficient time for its completion before the successive order is executed.

It is still another object of the present invention to provide a digital control system of the class referred to wherein but a single analogue-to-digital conversion is required for automatically controlling a large number of different operations of the machine.

A further object of the present invention is to provide a digital control system of the class described adapted for automatically controlling the turret slide, the back-cross slide, the front-cross slide, the forward-reverse mechanism, the deflector mechanism, the turret index mechanism, and the stock feed mechanism of a Brown and Sharpe automatic screw machine.

It is still further an object of the present invention to provide a digital control system of the type referred to wherein each order is executed in time referenced to the motion of the main spindle of the Brown and Sharpe automatic screw machine.

In accordance with the basic concepts of the present invention, the operations of a machine tool are automatically controlled by a group of orders in digital signal form, each order including timing instructions relating to the time of performance of the order and order number instructions relating to the specific mechanical operation to be performed by the machine in response to the order. The time of performance of each order is referenced in accordance with a single continuously moving part of the machine. More specifically, all operations of the machine which are controlled by the digital control system of the present invention are time referenced relative to the motion of a single moving part of the machine. Thus, the necessity for a digital-servo feedback loop for each controlled operation of the machine is eliminated, a single analogue-to-digital conversion being sufficient for all operations.

Each order of an order group is successively acted upon by the controlled machine, each order being time-referenced, in accordance with a predetermined program, to allow sufficient time for its performance before the succeeding order becomes effective. Thus no digital signals, other than the signals from the single reference part of the machine, are required to be produced from the moving mechanisms of the controlled machine, each order having been allotted sufficient time for its performance before the desired operation represented by the succeeding order is commenced.

In its basic structural form an automatic digital control system in accordance with the present invention includes a servo circuit having a separate servo mechanism for each controlled operation of the machine tool, a memory circuit, a sequence circuit, and a timing circuit. The memory circuit stores the entire group of orders and consecutively produces, during each operational cycle of the machine tool, each of the group of orders in coded binary signal form. As the binary digital signals of each order are developed by the memory circuit they are channeled by the sequence circuit to a corresponding one of the servo mechanisms in the servo circuit, the digital signals of each order being channeled to the servo mechanism capable of carrying out the intent of the order. The timing circuit is provided to time the performance, by the servo circuit, of each controlled operation of the machine tool in accordance with the timing instructions included within each order. The timing circuit, therefore, responds to the timing instructions of each order developed by the memory circuit and digit signals from a single reference moving part of the machine tool for developing timing signals which are applied to the appropriate servo mechanisms in the servo circuit. Each servo mechanism in the servo circuit, in response to the orders and timing signals applied thereto, causes the desired operation to be performed by the controlled machine at the desired time.

More particularly, the timing circuit of a digital control system in accordance with the present invention adapted for automatically controlling a Brown and Sharpe screw machine is time referenced in respect to the rotation of the work spindle of the machine. Each revolution of the spindle of the machine is translated into a digital pulse by a permanent magnet mounted on the periphery of the spindle and a pulse producing pickup mounted fixed and in close proximity thereto. The pulses produced by the rotation of the spindle are applied to a counter. The counter develops output signals indicating the total number of spindle revolutions of the machine from the time the machine commences an operational cycle, the counter being reset to zero at the beginning of each cycle. Thus each order is performed at a time referenced by the count produced by the spindle counter.

An adaptation of the automatic digital control system of the present invention for automatically controlling a Brown and Sharpe screw machine includes, within the servo circuit, a separate servo mechanism for each of the following mechanical operations of the machine: (1) the motion of the turret slide, (2) the motion of the back-cross slide, (3) the motion of the front-cross slide, (4) actuation of the forward-reverse tripping lever, (5) actuation of the deflector tripping lever, (6) actuation of the turret index tripping lever, and (7) actuation of the stock-feed tripping lever.

Included in each of the slide servos is a slave "synchro," which in conjunction with a master "synchro" located in the sequence circuit, forms a "synchro system" for accurately controlling the stopping point of the corresponding slide at the end of a cutting operation. As herein used, a "synchro" is defined as a rotary inductor similar to an induction regulator, in which variable coupling is obtained by changing the relative orientation of the primary and the secondary windings within the inductor. Normally the secondary winding is fixed to provide the field winding of the synchro and the primary winding forms part of the moving armature. The term synchro system is herein used to denote the use of two of such synchros, as above defined, connected electrically back to back in conjunction with a servo system, such a system providing means for transmission of angle or torque by locating one of such units, such as the master synchro in the present instance, in a certain angular position, the other unit, the slave synchro, having a torque developed which causes the other unit to assume the same angular position. Such systems are well known and explained in detail in the Massachusetts Institute of Technology, Radiation Laboratory Series, volume 17, pages 310 to 327, inclusive and volume 25, pages 78 to 95, inclusive.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 5 is a schematic circuit diagram in partial block form of the digital-to-analogue converter amplifier and the potentiometer circuit illustrated in Fig. 3; and Fig. 6 is a schematic circuit diagram of the digital-to-analogue voltage divider circuit included in the circuit of Fig. 5.

Figure 1:
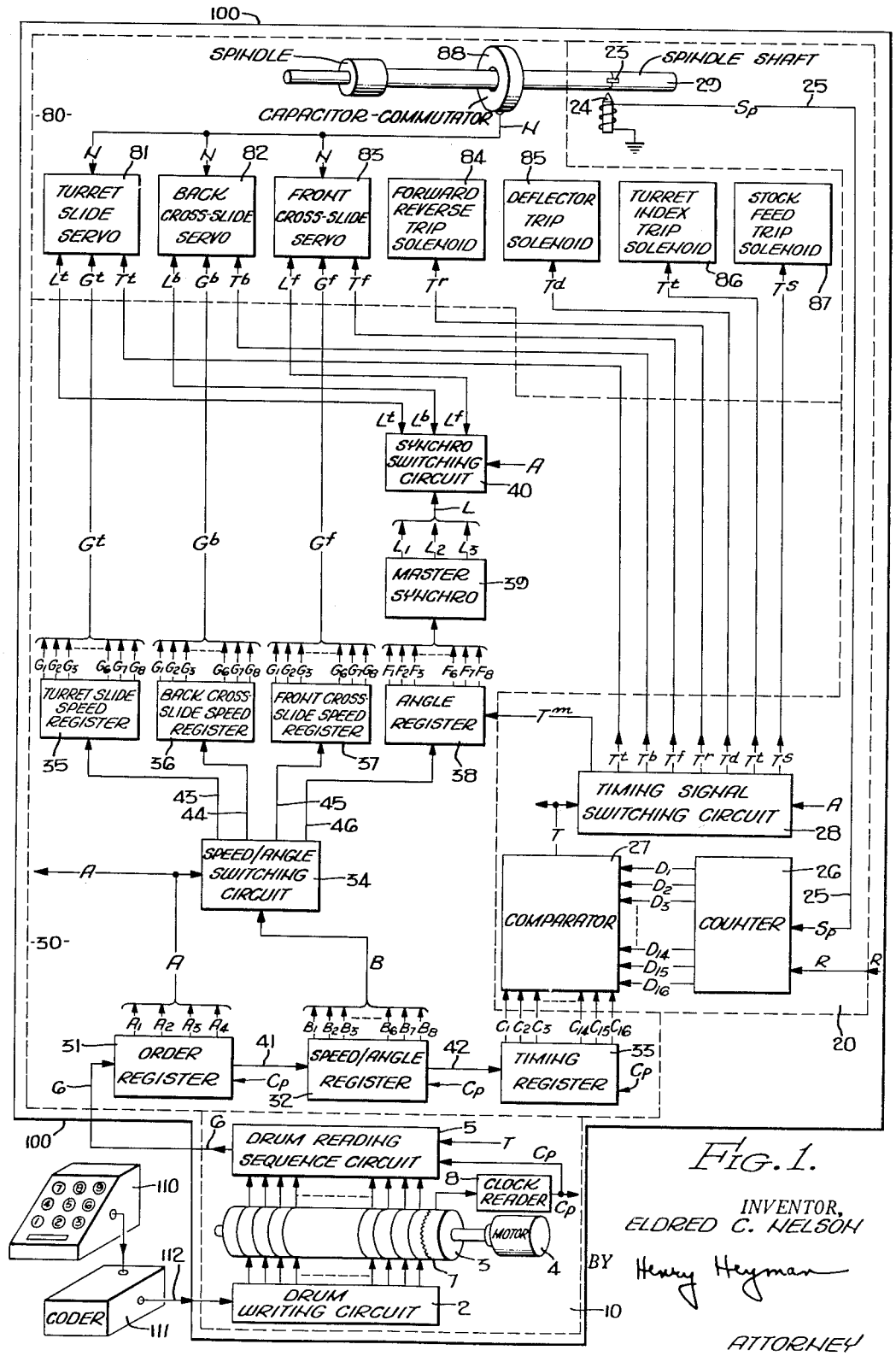
Fig. 1 is a schematic diagram in block form of an automatic digital control system in accordance with the present invention adapted for automatically controlling the operation of a Brown and Sharpe screw machine.

Reference is now made to the drawings and particularly to Fig. 1 wherein there is presented in schematic block form an automatic digital control system 100, indicated by broken lines, in accordance with the basic concepts of the present invention and adapted for controlling a Brown and Sharpe automatic screw machine. The automatic digital control system 100 is adapted to receive a group of orders in digital signal form and a reset signal R as illustrated and produced by the screw machine, and in response thereto controls the mechanical operations performed by the machine during each operational cycle of an entire operational period of the machine.

The group of orders is originated by a programmer who keys the orders on a keying mechanism 110 producing electrical signals in response thereto which are applied to the input of a coder 111. The coder 111 translates the signals produced by the keying mechanism 110 into digital signals which are fed by input cable 112 to the automatic digital control system 100.

The automatic digital control system 100 includes a memory circuit 10, a timing circuit 20, a sequence circuit 30, and a servo circuit 80, each circuit being enclosed by broken lines in the figure. The memory circuit 10 stores the group of orders received by the control system 100 for the entire succeeding operational period of the automatic screw machine. In addition, the memory circuit 10 develops, during each operational cycle of the machine, the entire group of orders in a sequential manner, each order being developed in binary signal form at an output lead 6 in response to a timing signal T obtained from the timing circuit 20. The sequence circuit 30 is coupled to the memory circuit 10 and is responsive to the order signals appearing on lead 6 and to timing signals $T^m$ obtained from the timing circuit 20 for developing timing register signals $C_1$, $C_2$, $C_3$, . . . $C_{14}$, $C_{15}$, and $C_{16}$, servo control signals $G^t$, $G^b$, and $G^f$, synchro control signals $L^t$, $L^b$, and $L^f$ developed by a master synchro forming part of a master synchro circuit 39 included therein, and order number signals A. The timing circuit 20 is coupled to the memory circuit 10 and to the sequence circuit 30 and responsive to the timing register signals $C_1$, $C_2$, $C_3$, . . . $C_{14}$, $C_{15}$, and $C_{16}$ and order number signals A developed by the sequence circuit 30, and the reset signals R produced by the screw machine at the end of each operational cycle, for developing timing signals T and $T^m$, and a set of servo timing signals $T^t$, $T^b$, $T^f$, $T^r$, $T^d$, $T^i$, and $T^s$.

Included in the timing circuit 20 is a magnetic pickup 24 disposed stationary near the outer periphery of the work spindle shaft 29 of the screw machine and within the plane of revolution of a permanent magnet 23 affixed on the outer surface of the spindle 29. Thus a revolution pulse Sp is developed at the output lead 25 of the pickup 24 which is utilized, as will be explained in detail later on, in the production of the timing signals by the timing circuit 20.

The servo circuit 80 is coupled to the timing circuit 20 and to the sequence circuit 30 and responsive to the servo timing signals $T^t$, $T^b$, $T^f$, $T^r$, $T^d$, $T^i$, and $T^s$, the servo control sgnals $G^t$, $G^b$, and $G^f$, and the synchro control signals $L^t$, $L^b$, and $L^f$ for converting the servo and the synchro control signals into analogue mechanical motion within the screw machine at time intervals determined by the servo timing signals. Included within the servo circuit 80 is a turret slide servo 81, a back-cross slide servo 82, a front-cross slide servo 83, a forward-reverse trip solenoid 84, a deflector trip solenoid 85, a turret index trip solenoid 86, and a stock feed trip solenoid 87, each being servo circuits for performing a corresponding one of the automatically controlled operations of the screw machine as will be brought out in detail later on.

In order to illustrate and describe the structure and functional operation of the automatic digital control system 100 of the present invention, it is convenient to assume at the outset certain characteristics of the order group and order signals received by the automatic digital control system 100, although it should be understood that the invention is not so limited. It will be assumed, therefore, that each order of the order group is comprised of a series of decimal digits received by means of input cable 112 in binary-coded decimal form where each decimal digit is represented in the conventional 1-2-4-8 binary code. It will also be assumed that each binary digit is represented by an electrical voltage signal or pulse, each signal having one of possible two levels, a relatively high or 1 voltage level and a relative low or 0 voltage level. A binary 1 and a binary 0 digit will hence be represented by a relatively high or 1 level and a relatively low or 0 level voltage signal or pulse, respectively. Thus the electrical pulses or signals representing each decimal digit may be represented as in Table I below, where the decimal digits are indicated on the left hand column and the binary signals representing the decimal digits on the remaining four columns of the table, each 1 and 0 in these latter columns representing a relatively high and a relatively low voltage signal, respectively.

Table I

|  |  |  |  |  |  |
|---|---|---|---|---|---|
|  | (1) | 0 | 0 | 0 | 1 |
|  | (2) | 0 | 0 | 1 | 0 |
|  | (3) | 0 | 0 | 1 | 1 |
|  | (4) | 0 | 1 | 0 | 0 |
|  | (5) | 0 | 1 | 0 | 1 |
|  | (6) | 0 | 1 | 1 | 0 |
|  | (7) | 0 | 1 | 1 | 1 |
|  | (8) | 1 | 0 | 0 | 0 |
|  | (9) | 1 | 0 | 0 | 1 |
| (10) or | (0) | 0 | 0 | 0 | 0 |
|  | (11) | 1 | 0 | 1 | 1 |

It is obvious that 11 is not a true single decimal digit but a number comprised of two decimal 1 digits. As will be made more apparent later on, normally each decimal digit of a decimal number will be represented by 4 binary digit signals in accordance with Table I above for decimal digits 0 to 9, inclusive, except for order identification numbers where the numbers 10 and 11 will each be represented by 4 binary coded digits as in Table I above.

From the previous discussion of the screw machine, it is apparent that in order to completely control the operation of the machine during each operational cycle, the order group must include orders for operating the following: (1) motion of the turret slide, (2) motion of the back-cross slide, (3) motion of the front-cross slide, (4) the forward-reverse trip, (5) the deflector trip, (6) the turret index trip, and (7) the stock feed trip.

Since the above operations 4 to 7, inclusive, operate mechanically in a screw machine in response to the actuation or depression of a separate trip lever for each, each desired operation one of these mechanisms may be directed by a single order designating the time the mechanism trip lever is to be actuated. Three characteristics of the motion of the various slides must be considered, however, in the control of a slide, the time the slide is to be put in motion, the desired speed of travel of the slide, and the desired stopping time, i. e., the point at which the slide is to be stopped. As will be explained in detail later on, the motion of a slide is controlled in three steps; (1) the slide is set in motion at the desired time and at a desired velocity, (2) the master synchro 39 of the sequence circuit 30 is then set at an axial position calibrated to represent the exact desired stopping point of the slide, (3) the master synchro is finally "tied-in" with the corresponding slide servo of the servo circuit 80 at the beginning of the last revolution of the spindle 29 during which the slide is to move, thus controlling the terminal travel of the slide and its final stopping point by the master synchro.

Accordingly, it will be assumed that the following orders will be utilized in directing the operations of a screw machine:

Table II

| Order No. | Description |
|---|---|
| 1 | Activate Stock Feed at _____ total spindle revolutions. |
| 2 | Index Turret at _____ total spindle revolutions. |
| 3 | Activate Deflector at _____ total spindle revolutions. |
| 4 | Reverse Spindle at _____ total spindle revolutions. |
| 5 | Set Master Synchro at _____ mils angle at _____ total spindle revolutions. |
| 6 | Start Turret Slide at _____ mils per spindle revolution at _____ total spindle revolutions. |
| 7 | Connect Master Synchro to Turret Synchro at _____ total spindle revolutions. |
| 8 | Start Front-Cross Slide at _____ mils per spindle revolution at _____ total spindle revolutions. |
| 9 | Connect Master Synchro to Front-Cross Slide Synchro at _____ total spindle revolutions. |
| 10 | Start Back-Cross Slide at _____ mils per spindle revolution at _____ total spindle revolutions. |
| 11 | Connect Master Synchro to Back-Cross Slide Synchro at _____ total spindle revolutions. | wherein the dashes are utilized to indicate that the orders include numerical values peculiar to each order.

It will be noted that order Nos. 1 to 4, inclusive and 7, 9, and 11 require but one number in each order, i. e., the starting time in terms of total spindle revolutions. Orders 6, 8, and 10, however, require two numbers, the starting time of the slide in terms of total spindle revolutions and the desired speed of travel of the slide in terms of mils per spindle revolutions. Order No. 5 similarly requires two numbers, the angle and time of setting the master synchro expressed in mils travel and total spindle revolutions, respectively. As indicated by order number 5, the angle of the master synchro setting is referred to as "mils-angle." The mils-angle or angle of the master synchro is herein defined as the mils travel of a slide permitted by the master synchro after the master synchro has been "tied-in" or connected to the slide servo, which is determined by the angular setting of the master synchro. It will be assumed therefore that each order includes eight decimal digits, two digits for the order or identification number, two decimal digits for speed in mils per spindle revolution or angle in mils travel where applicable, and four digits for the time in total spindle revolutions. For convenience, the above sections of an order will hereinafter be referred to, respectively, as the order number section, the speed/angle instruction section, and the timing instruction section of an order. In orders 1 to 4, and 7, 9, and 11, speed/angle instructions are not required, thus two zeros will be used in the speed/angle instruction sections of these orders. A typical order, in decimal digit form, is illustrated below with the three major sections of the order indicated and labeled.

| 1 | 0 | 0 | 4 | 2 | 7 | 8 | 5 |
|---|---|---|---|---|---|---|---|

| Order number section | Speed/angle instruction section | Timing instruction section | | |
|---|---|---|---|---|

The above order indicates that it is order number 10, that the back-cross slide is to be moved four mils per spindle revolution, and that the slide is to commence motion at the 2,785th spindle revolution of each operational cycle.

It will be further assumed that the order or identification number will be represented by four binary digit signals in accordance with Table I above, order numbers 10 and 11 being identified by binary signals 0000 and 1011, respectively. Each decimal digit of the speed/angle and timing instruction numbers will be represented by four separate binary digit signals, the representation for 11 in Table I being excluded, and binary signals 0000 representing a decimal 0 only. Utilizing this code, the complete binary-coded decimal form of the above example of an order is specified as follows:

| Decimal | 10 | 0 | 4 | 2 | 7 | 8 | 5 |
|---|---|---|---|---|---|---|---|
| Binary | 0000 | 0000 | 0100 | 0010 | 0111 | 1000 | 0101 |
|  | Order number section | Speed/angle instruction section | Timing instruction section | | | | |

The memory circuit 10 of Fig. 1 includes a drum writing circuit 2 for receiving the group of binary-coded orders produced by the coder 111 on input cable 112 and for recording, in magnetic form, each order of the group on an individual order channel of a magnetic drum 3 rotated by a motor 4, each binary digit of an order being aligned longitudinally with a corresponding clock signal or synchronizing pulse previously recorded on clock channel 7 of the drum 3. The memory circuit 10 further includes a clock reader 8 for reading the clock signals recorded on the clock channel 7 and producing clock or synchronizing pulses $C_p$, one clock pulse $C_p$ being produced for each binary digital place of the orders recorded on the drum 3. In addition, the memory circuit 10 includes a drum reading sequence circuit 5 responsive to the clock pulses $C_p$ and timing pulses T for reading the orders recorded on the order channels of the drum 3 and producing a series of binary output signals on the output lead 6, in synchronism with the clock pulses $C_p$, representing the binary signals recorded on the drum 3. The reading circuit 5 is a selective drum reading ciruit well known in the art wherein channels on a drum are selectively read in response to control signals. The reading circuit 5 is thus utilized to selectively read, in a sequential manner, each order channel on drum 3 during each operational cycle of the screw machine, i. e., only one order channel being read at a time. More specifically, the first order channel to the extreme right of drum 3 is first read, then the second from the right, and so on, the reading circuit 5 shifting to the next channel to the left in response to seach timing signal T. At the end of an operational cycle of the controlled machine tool, the reading circuit 5 is again shifted to the extreme right-hand order channel by signals T thus being ready to read the first order at the beginning of the succeeding operational cycle. In addition, the binary digit signals of each order appear on the output lead 6 in a serial train, the least significant binary digit of the least significant decimal digit of the timing instructions appearing first and the most significant binary digit of the most significant decimal digit of the order number appearing last.

Included in the sequence circuit 30 is an order register 31, a speed/angle resgister 32 and a timing register 33 connected in tandem, each of which is a shifting register well known in the art.

A shifting register is essentially a storage device capable of storing a series or group of binary signals and producing two-level output signals representing the binary digits stored therein. Like a static storage register, it is comprised of a group of individual binary digit storage elements of the same construction, each responsive to an associated one of the group of binary digit signals impressed on the register for storing the binary digit represented by the signal and producing a corresponding one of the two level output signals representing the binary digit stored therein. Unlike a static register, a shifting register is capable of shifting the binary digit stored in each of the storage elements to the adjacent storage element upon reception of a shifting pulse, thus as is normally the case, shifting the entire group of digits one binary digit place to the right in response to each shifting pulse.

The binary digits stored in the shifting register may be entered either serially or in parallel, i. e., each binary digit may be entered in the storage element to the extreme left of the register and shifted one place to the right as each new digit is entered, or all digits may be entered simultaneously in corresponding ones of the storage elements.

Shifting registers operable as above described are considered in detail in an article entitled "A transistor shifting register and serial adder" by James R. Harris, Proc. IRE, November 1952, pages 1597 to 1598. Electronic circuits providing both dynamic and static registers, i. e., non-shifting registers and shifting registers, are described in detail in an article entitled "Digital computer switching circuits," by C. H. Page in Electronics, September 1948, volume 21, pages 110 to 118.

The binary digit signals of each order appearing on output lead 6 of the memory circuit 10 are serially entered in the order register 31 in synchronism with clock pulses $C_p$, i. e., the stored digits are shifted one place to the right upon reception of each $C_p$ pulse. The register 31 has a 4 binary digit storage capacity and develops two-level order register signals $A_1$, $A_2$, $A_3$, and $A_4$ indicating the digits stored in each of the storage elements. Each binary digit shifted out of the extreme right-hand storage element of the register 31 is transferred to the first storage element of the 8 element shifting register 32 by input lead 41. The speed/angle shifting register 32 develops output signals $B_1$, $B_2$, $B_3$, . . . $B_6$, $B_7$, $B_8$, indicating at any instant the value of the binary digits stored therein, and shifts the digits one place to the right upon reception of each clock pulse $C_p$. The digits shifted out of the last or extreme right-hand storage element of register 32 are impressed by lead 42 to the first storage element of the timing register 33. The timing register 33 has a capacity of 16 binary digits, i. e., it has 16 binary digit storage elements, and produces two-level timing register signals $C_1$, $C_2$, $C_3$, . . . $C_{14}$, $C_{15}$, $C_{16}$ indicating the digits stored. Similar to the operation of registers 31 and 32, the digits stored are shifted one place to the right in response to each clock pulse $C_p$.

Since, as previously mentioned, each order comprises a total of 28 binary digit signals synchronized with 28 successive clock pulses $C_p$, each order will appear in its entirety in registers 31, 32, and 33. Also since the binary signals of each order appear serially on input lead 6 with the 16 binary digits of the timing instructions first, the 8 digits of the speed/angle instructions, next, and the 4 digits of the order number last, the timing instructions will be registered in the timing register 33, the speed/angle instructions in the speed/angle register 32, and the order number in the order register 31 when the entire order has been shifted into the registers.

Once a complete order has been shifted into the registers 31, 32, and 33, the binary digits are "locked" therein, due to the cessation of clock pulses $C_p$, until the succeeding order is read out by the memory cricuit 10.

The sequence circuit 30 further includes a speed/angle switching circuit 34, a turret slide speed register 35, a back-cross slide speed register 36, a front-cross slide speed register 37, an angle register 38, the master synchro 39, and a synchro switching circuit 40.

The speed/angle switching circuit 34 is coupled to the order register 31 and the speed/angle register 32 and is therefore responsive to signals $A_1$, $A_2$, $A_3$, $A_4$ and $B_1$, $B_2$, $B_3$, . . . $B_6$, $B_7$, $B_8$ produced by registers 31 and 32, respectively, and conveniently referred to as signals A and B, respectively, for selectively switching or gating signals B to one of four possible output cables 43, 44, 45, and 46 in accordance with signals A. Each of the registers 35, 36, 37, and 38 is a static storage register having an 8 binary digit storage capacity and coupled to the switching circuit 34 by an associated one of the cables 43, 44, 45, and 46. The purpose of register 35 is to store the binary digits representing the desired speed of travel of the turret slide of the screw machine preparatory to execution of an order; the purpose of register 36 is to store digits represeting the desired speed of travel of the back-cross slide of the machine for execution of an order; register 37 stores the desired speed of travel of the front-cross slide; and the angle register 38 stores the desired angle of the master synchro 39 in accordance with an order.

Thus the switching circuit 34 causes signals B, representing the speed/angle instruction of an order, to be transferred and stored as binary digits in an appropriate one of the registers 35, 36, 37, and 38 in conformity to the nature of the order as indicated by signals A. For example, if signals A represent a decimal 6, it is seen from Table II, that the speed/angle instructions refer to the speed of travel of the turret slide, and signals B will therefore be impressed by the switching circuit 34 on the turret slide speed register 35. By way of another example, assume that signals A represent a decimal 8, then signals B will be gated by switching circuit 34 on cable 45 thus impressing the signals on register 37. Similarly signals A representing decimal numbers 5 and 10 will cause switching circuit 34 to gate signals B to output cables 46 and 44, respectively, thus impressing signals B on the input circuits of registers 38 and 36.

Switching or selecting circuits capable of performing the above described functions of the speed/angle switching circuit 34 are well known in the art. Such circuits generally fall into one of two general classes, relay switching circuits and electronic switching circuits. Both relay and electronic switching circuits are described from both a functional and structural point of view in a book entitled "The Design of Switching Circuits," by William Keister, D. Van Nostrand Company, Inc., New York, 1950. The use of diode coincidence circuits is described in an article entitled "Diode coincidence and mixing circuits in digital computers," by Tung Chang Chen, in Proceedings of the IRE, volume 38, May 1950, pages 511 to 514. Crystal diode switching circuits are described in an article entitled "Rectifier network for multiposition switching," by David R. Brown and Nathaniel Rochester, in Proceedings of IRE, volume 37, Feburary 1949, pages 139 to 147.

Each of the registers 35, 36 and 37 produces 8 two-level voltage output signals $G_1$, $G_2$, $G_3$, . . . $G_6$, $G_7$, $G_8$ representing the binary digits stored therein. For convenience the $G_1$, $G_2$, $G_3$, . . . $G_6$, $G_7$, $G_8$ signals produced by registers 35, 36, and 37 are referred to as signals $G^t$, $G^b$, and $G^f$, respectively.

The angle register 38, in response to the signals from the switching circuit 34 impressed theron by input cable 46 and in response to 1 level timing signals $T^m$ from the timing circuit 20, produces two-level output signals $F_1$, $F_2$, $F_3$, . . . $F_6$, $F_7$, $F_8$ which are impressed on the master synchro circuit 39 previously referred to.

The master synchro circuit 39 in response to signals $F_1$, $F_2$, $F_3$, . . . $F_6$, $F_7$, $F_8$ from the angle register 38 produces three non-digital or analogue voltage signals $L_1$, $L_2$, and $L_3$, developed by the stator three-phase Y winding of the master synchro included therein, conveniently referred to as signals L, which are impressed on the synchro switching circuit 40 coupled thereto. The complete theory of operation together with practical embodiments of synchros are discussed in detail in the previously cited Radiation Laboratory reference. The cited reference describes more fully the nature and characteristics of the three-phase Y stator mechanisms. The switching circuit 40 in response to signals A impressed thereon from the order register 31 selectively switches or gates signals L to one of three possible output cables thus forming signals $L^t$, $L^b$, or $L^f$. More specifically, the switching circuit 40 channels signals L to output cables $L^t$, $L^b$, and $L^f$ in response to signals A representing order numbers 7, 11, and 9, respectively, which from Table II, are seen to represent orders for connecting the master synchro to the turret, back-cross, and front-cross slides, respectively. The switching circuit 40 is similar to the switching circuit 34 previously described in that one group of input signals is selectively gated or switched to one of a plurality of possible output cables in response to the binary digit signals A, and therefore further explanation is deemed unnecessary at this point.

The timing circuit 20 of the automatic digital control system 100 of Fig. 1 includes, in addition to the previously referred to spindle magnet 23 and spindle pickup 24 which produces a pulse $Sp$ in response to each revolution of the spindle shaft 29 of the screw machine, a counter 26 responsive to the pulses $Sp$ for counting the revolutions of the spindle shaft 29. The counter 26 is also responsive to a reset pulse R, produced by the machine at the end of each operational cycle, for resetting the counter 26 to zero. A comparator 27 is coupled to the counter 26. The counter 26 produces two-level output signals $D_1$, $D_2$, $D_3$, . . . $D_{14}$, $D_{15}$, $D_{16}$, the aggregate of which represent, in 1-2-4-8 binary-coded decimal form, the accumulated count of the counter 26 at that instant. The comparator 27 is responsive to signals $D_1$, $D_2$, $D_3$, . . . $D_{16}$ received therefrom and signals $C_1$, $C_2$, $C_3$, . . . $C_{16}$ produced by the timing register 33 of the sequence circuit 30 for producing a two-level output voltage signal T having a 1 level when signals $D_1$, $D_2$, $D_3$, . . . $D_{16}$ are equivalent to signals $C_1$, $C_2$, $C_3$, . . . $C_{16}$, i. e., when both groups of signals represent the same decimal number, and having a 0 level at all other times. Thus signal T will be at a 1 level when the total revolution count of the spindle shaft 29 during an operational cycle is simultaneously equal to the value of the timing instruction section of an order stored in register 33 of the sequence circuit 30.

The counter 26 is a counter well known in the prior art wherein each decimal digit of the number representing the total count is indicated by corresponding four signals of the 16 two-level voltage output signals $D_1$, $D_2$, $D_3$, . . . $D_{14}$, $D_{15}$, $D_{16}$ in a 1-2-4-8 binary-coded decimal form. Each of the 4 two-level voltage output signals representing a corresponding decimal digit of the count in the counter 26 is developed by an associated decade counter or decade scaler included in the counter. A decade counter is a conventional counter having four bistable elements connected to provide a count of ten.

Decade counters are described generally in "High Speed Computing Devices," by the Engineering Research Association, McGraw-Hill Publishing Co., Inc., New York, pages 25 to 28, inclusive. Specific circuitry and operating characteristics of decade or scale of ten counters are described in "Electronics," by William C. Elmore and Mathew Sands, McGraw-Hill Publishing Co., Inc., 1949, pages 209 to 212.

By assigning each of the four decade counters in the counter 26 a decimal digital significance so that the output signals of each decade counter represent, in binary signal form, a corresponding decimal digit of the accumulated count, the four decade counters may then be connected in tandem. More specifically, each time the lowest order decade counter reaches its count capacity of decimal 9, the succeeding count pulse $Sp$ causes the decade counter to recycle to its zero count and generate a carry pulse which triggers the next higher order decade counter. A decade counter suitable for producing an output carry pulse for application to the next stage is described in detail in U. S. Patent 2,577,075, entitled "Binary-Decade Counter," by Arthur H. Dickinson. An improved counter comprised of four decade counters connected in tandem as above explained suitable for the present invention is described in detail in copending patent application Serial No. 464,410 for "Digital Systems for the Automatic Control of Machinery," by Claude A. Lane and Doran C. Hierath, filed October 25, 1954.

The comparator circuit 27 of the timing circuit 20 is primarily a magnitude comparator wherein the timing signal T is a 0 level signal as long as the magnitude of the number in the timing register 33, represented by signals $C_1$, $C_2$, $C_3$, . . . $C_{14}$, $C_{15}$, $C_{16}$ is greater than the magnitude of the number in the counter 26, represented by signals $D_1$, $D_2$, $D_3$, . . . $D_{14}$, $D_{15}$, $D_{16}$. When the number represented by signals $D_1$, $D_2$, $D_3$, . . . $D_{14}$, $D_{15}$, $D_{16}$ is equal to or greater than the number represented by signals $C_1$, $C_2$, $C_3$, . . . $C_{14}$, $C_{15}$, $C_{16}$, the comparator 27 produces a 1 level signal T.

Although magnitude comparator circuits of this class are known in the art, an improved magnitude comparator particularly suited to perform the functions of the comparator 27 of the present invention is described in detail in copending patent application Serial No. 394,441 for "Electronic Magnitude Comparator," by Robert Royce Johnson, filed November 25, 1953.

The timing signals T developed by comparator 27 are impressed on a timing signal switching circuit 28 also included in the timing circuit 20. The switching circuit 28, in response to order signals A impressed thereon, develops servo timing signals $T^m$, $T^t$, $T^b$, $T^f$, $T^r$, $T^d$, $T^i$, and $T^s$ which are impressed on the angle register 38, the turret slide servo 81, the back-cross slide servo 82, the front-cross slide servo 83, the forward-reverse trip solenoid 84, the deflector trip solenoid 85, the turret index trip solenoid 86, and the stock feed trip solenoid 87, respectively, included in, and previously mentioned, with respect to the servo circuit 89. The switching circuit 28 essentially gates or switches the timing signals T impressed thereon to directly produce one of the servo timing signals $T^m$, $T^t$, $T^b$, $T^f$, $T^r$, $T^d$, $T^i$, and $T^s$ equal to the level of the timing signal T in response to each group of order number signals A, the remaining servo timing signals remaining as 0 level signals regardless of the voltage level of signals T. Thus, from Table II, timing signals T are gated to produce signals $T^m$, $T^t$, $T^b$, $T^f$, $T^r$, $T^d$, $T^i$, and $T^s$ in response to order number signals A representing decimal numbers 5, 6 or 7, 10 or 11, 8 or 9, 4, 3, 2, and 1, respectively. The timing signal switching circuit 28 is similar to speed/angle switching circuit 34 in the sequence circuit 30 previously discussed in detail and therefore further explanation is not deemed necessary at this point.

In addition to the turret slide servo 81, the back-cross slide servo 82, the front-cross slide servo 83, the forward-reverse trip solenoid 84, the deflector trip solenoid 85, the turret index trip solenoid 86, and the stock feed trip solenoid 87, the servo circuit 80 of Fig. 1 further includes a capacitor-commutator 88 fastened to the spindle 29 of the screw machine tool for generating a voltage regulator signal N having a magnitude directly proportional to the rotational speed of the spindle 29. A capacitor-commutator tachometer is essentially a direct-current voltage generator being especially designed to be extremely sensitive to small changes in rotational velocity and producing an output voltage varying linearly with changes in rotational velocity. Capacitor-commutators of this class are described in detail in an article entitled "Capacitor commutator tachometers," by F. K. Floyd, in Product Engineering, July 1953, volume 7, pages 182 to 185.

The turret slide servo 81 is responsive to synchro control signals $L^t$ obtained from switching circuit 40, servo control signals $G^t$ developed by speed register 35, servo timing signals $T^t$ generated by switching circuit 28 and voltage regulator signals N impressed thereon from commutator 88 for automatically controlling the mechanical motions of the turret slide of the machine. The back-cross slide servo 82 in response to synchro control signals $L^b$, servo control signals $G^b$, servo timing signals $T^b$, and the voltage regulator signals N, automatically controls the motion of the back-cross slide. Similarly, the front-cross slide servo 83 automatically controls the movements of the front-cross slide in response to signals $L^f$, $G^f$, $T^f$, and N.

The forward-reverse trip solenoid 84, the deflector trip solenoid 85, the turret index trip solenoid 86, and the stock feed trip solenoid 87, in response to servo timing signals $T^r$, $T^d$, $T^t$, $T^s$, respectively, automatically actuate the corresponding trip levers and thus set in motion the mechanical operations of the forward-reverse, the deflector, the turret index, and the stock feed mechanisms, respectively, of the machine. Each of the trip solenoids 84, 85, 86, and 87 includes an electromagnetic, moving-armature, solenoid. The moving armature of each solenoid is linked to the associated trip lever of the corresponding mechanisms in the machine in a manner such that energization of the holding coil of the solenoid causes the armature to pull down or depress the corresponding lever. Each of the servo timing signals $T^r$, $T^d$, $T^t$, and $T^s$ is applied to the holding coil of the corresponding solenoid in a manner such that the armature of the solenoid is not moved in response to a 0 level timing signal but sufficiently energized to pull down the armature, thus tripping or depressing the associated lever, in response to a 1 level timing signal.

Figure 2:
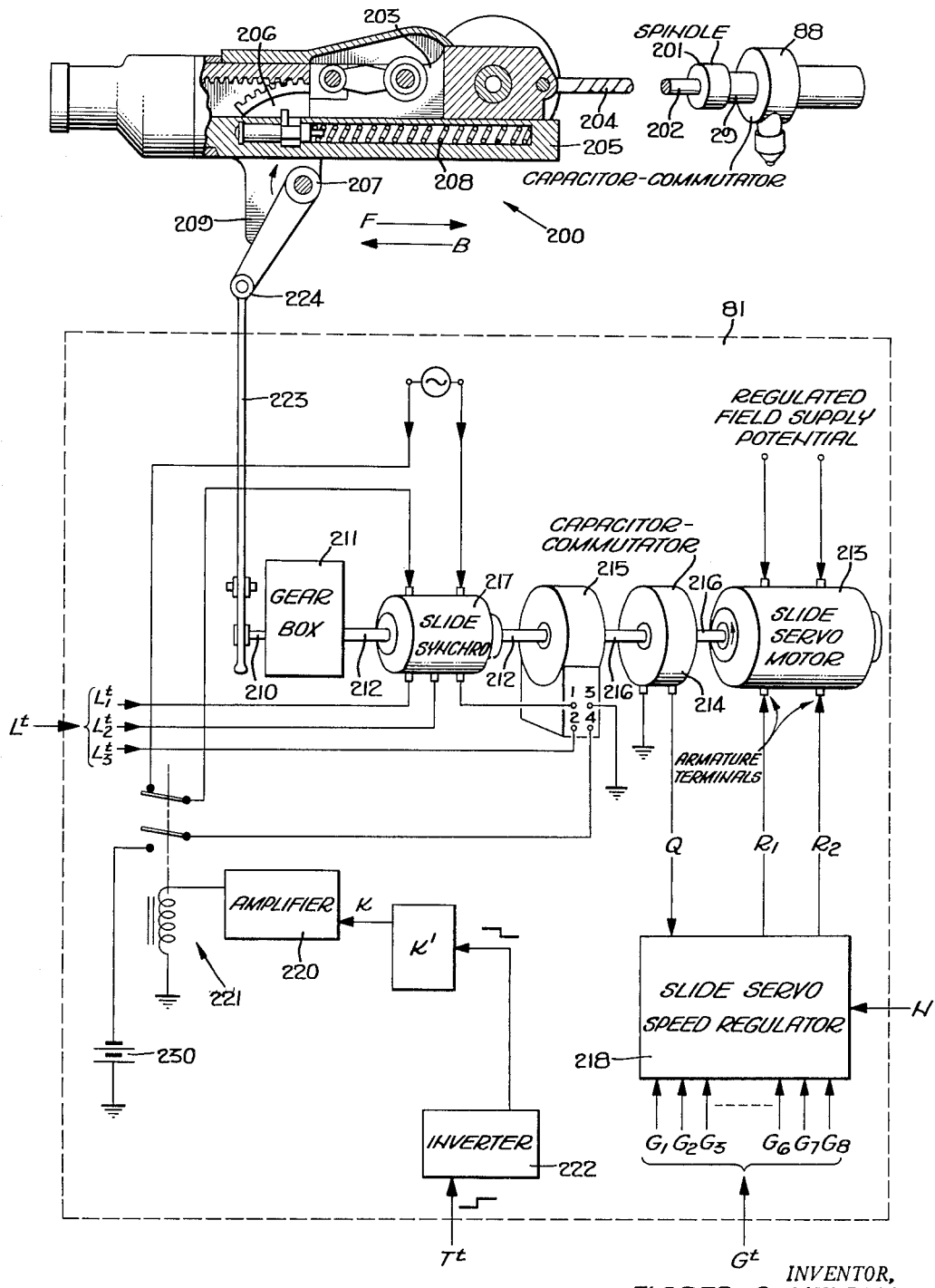
Fig. 2 is a schematic diagram, partially in block form, of the turret slide servo of Fig. 1.

The slide servos 81, 82, and 83 are similar in construction, and therefore only the turret slide servo 81 of Fig. 1 has been illustrated in specific detail in Fig. 2.

Reference is now made to Fig. 2 wherein there is presented a schematic diagram, partially in block form, of the turret slide servo 81, indicated by dotted lines, forming part of the servo circuit 80 of Fig. 1 for receiving synchro control signals $L^t$, servo control signals $G^t$, and servo timing signals $T^t$. The turret slide servo 81 serves the purpose of controlling the forward and backward motion of a turret slide 200 of the automatic screw machine along a longitudinal line coincident with the rotational axis of the spindle shaft 29. A spindle 201 is affixed to the end of the spindle shaft 29 for holding, with the aid of a collet (not shown), and thus rotating the rough stock or work 202 to be machined.

The turret slide 200 includes a movable rack 203 for holding a cutting tool 204 which moves backwards and forwards on a fixed frame 205, as indicated by the arrows F and B, respectively, thus moving the cutting tool 204 into and away from the rough stock 202. The forward motion of the movable rack 203 is controlled by the clockwise rotation of a sector gear 206 about its axis bearing 207 located on a cam lever 209. The backward motion of the rack 203 is produced by the spring tension developed by a spring 208 which automatically becomes effective upon cessation of the clockwise rotation of the sector gear 206 and disengagement of the sector gear and rack, thus returning the rack to the extreme backward position.

The capacitor-commutator 88 on the spindle shaft 29 for producing the voltage signal N illustrated in Fig. 1, is again illustrated in Fig. 2 for clarity of explanation.

The turret slide servo 81, in response to signals $G^t$, $L^t$, $T^t$, and N tends to rotate shaft 210 in a clockwise direction. The shaft 210 is keyed to a link 223 attached to a second bearing 224 on the cam lever 209. The shaft 210 is the output of a reduction gear box 211 for reducing the speed of rotation of a secondary servo drive shaft 212 coupled by a two-winding magnetic clutch 215 to a main servo drive shaft 216 that is rotated in a clockwise direction by a direct-current motor 213.

In addition, the turret slide servo 81 includes another capacitor-commutator 214 driven by the main drive shaft 216, a slide synchro 217, the rotor of which is directly coupled to the secondary drive shaft 212, a slide servo speed regulator 218, an inverter 222, a bistable flip-flop K', an amplifier 220, an electromagnetic relay 221, and a battery 230. Capacitor-commutator 214 is similar to the capacitor-commutator 88 in that it develops a voltage signal Q having an amplitude at any instant directly proportional to the rotational speed of the main drive shaft 216 at that instant. The voltage signal Q is fed to the slide servo speed regulator 218, which, in response to signals $G^t$, N, and Q develops a variable direct-current output potential $R_1$—$R_2$ which is applied to the armature windings of the slide servomotor 213. The field winding of motor 213 is energized from a well regulated field voltage supply as indicated. Thus the speed of motor 213 is determined by the amplitude of the potential $R_1$—$R_2$.

The magnitude clutch 215 has a direct-current (D. C.) winding connected to terminals 3 and 4, and an alternating-current (A. C.) winding connected to terminals 1 and 2, each winding, when energized, causing the direct coupling of the main drive shaft 216 to the secondary drive shaft 212. The D. C. winding of the magnetic clutch 215 is energized by a current developed from the battery 230, the negative terminal of which is connected to ground, the positive terminal being connected to one side of the normally open contacts of relay 221. The other side of the normally open contacts of relay 221 is connected to terminal 4 on the magnetic clutch 215. Terminal 3 of the clutch 215 is directly returned to ground, thus completing the D. C. current path for the A. C. winding of clutch 215 when the holding coil of relay 221 is energized.

The single-phase rotor winding of slide synchro 217 is supplied with current from a conventional 60 cycle A. C. supply, one side of the supply being connected to the rotor winding through the normally closed contacts of relay 221.

Signals $L^t$, representing the voltage signals developed by the three-phase Y stator windings of the master synchro in the master synchro circuit 39 of Fig. 1 are impressed on the corresponding phases of the three-phase Y stator windings of slide synchro 217, thus connecting the slide synchro 217 and the master synchro in the master synchro circuit 39 of Fig. 1 back-to-back as explained in detail in the above cited Radiation Laboratory Series reference on synchro circuits. One of the three-phase Y stator connections between the slide synchro 217 and the master synchro, specifically the $L^t_3$ signal connection, has the A. C. winding of the magnetic clutch 215 connected through terminals 1 and 2, connected in series thereto.

As is fully explained in the above cited reference, when the armature or rotor of the slide synchro 217 is "out of phase" or not aligned with the rotor of the master synchro of Fig. 1, a current is developed in the two three-phase back-to-back connected Y-stator windings, the current associated with voltage signals $L^t_3$ being sufficient to energize the A. C. winding of the magnetic clutch 215. However, when the two synchros are exactly in alignment, i. e., when each has its rotor exactly at the same angle in relation to its respective fixed field, the current associated with voltage signals $L^t_1$, $L^t_2$, and $L^t_3$ will substantially drop to zero, as a result of which the A. C. winding of magnetic clutch 215 will be de-energized.

The holding coil of relay 221 is energized by the output voltage of amplifier 220 which is merely a voltage amplifier for stepping up the voltage output produced by the true or 1 output signal K of a bistable flip-flop K' having a true or 1 stable state and a false or 0 stable state, in a manner such that the holding coil of relay 221 is energized when flip-flop K' is in its true or 1 state and de-energized when the flip-flop is in its 0 state. The input circuit of flip-flop K' is coupled to the output of an inverter circuit 222 which inverts the two-level servo timing signals $T^t$ applied to the input thereof.

The flip-flop K' is a conventional bistable flip-flop well known in the art which alternates its stable state upon each sudden drop in potential of the signals applied to its single input circuit. A flip-flop of this class produces on its true or 1 output circuit K a two-level voltage signal having a first relatively high or 1 level value when in its true or 1 state and a relatively low or 0 level value when in its 0 state. Thus, in response to each drop in potential of the input signals, which are represented by the output signals of the amplifier, flip-flop K' oscillates from the 1 to the 0 and from the 0 to the 1 state. Since the input signals to flip-flop K' are the inverse of signals $T^t$, flip-flop K' is triggered each time signal $T^t$ changes from a 0 level signal to a 1 level signal. A bistable flip-flop suitable for operation as the flip-flop K' of the present invention is described in detail and illustrated in Fig. 6a of U. S. Patent 2,644,887 entitled "Synchronizing Generator," by A. E. Wolfe, Jr.

At the beginning of an operational period of the automatic screw machine, the flip-flop K' is in its 0 state resulting in the de-energization of relay 221, the contacts being in the position indicated in the figure. At this time the slide synchro 217 and the master synchro 37 of Fig. 1 will be exactly aligned or in phase from the previous operational period, thus the magnetic clutch 215 will be completely de-energized thereby decoupling drive shaft 216 from drive shaft 212. The first rise from the 0 level to the 1 level of signals $T^t$ will trigger flip-flop K' to its true or 1 state causing relay 221 to be energized resulting in clutch 215 to be closed by energization of the D. C. winding. The next rise in signal $T^t$ from the 0 level to the 1 level will cause flip-flop K' to be triggered to its 0 state, resulting in relay 221 being deenergized. This will cause the D. C. winding of clutch 215 to be de-energized and the A. C. winding of the clutch to be energized by signals $L^t_3$ from the master synchro 37 of Fig. 1 until the master synchro 37 and the slide synchro 217 are aligned. When the master and slide synchros are exactly aligned, clutch 215 will be completely de-energized thus de-coupling drive shaft 216 from drive shaft 212, leaving the two synchros aligned and stopping the slide motion of the turret slide rack 293 of the turret slide 200.

Figure 3:
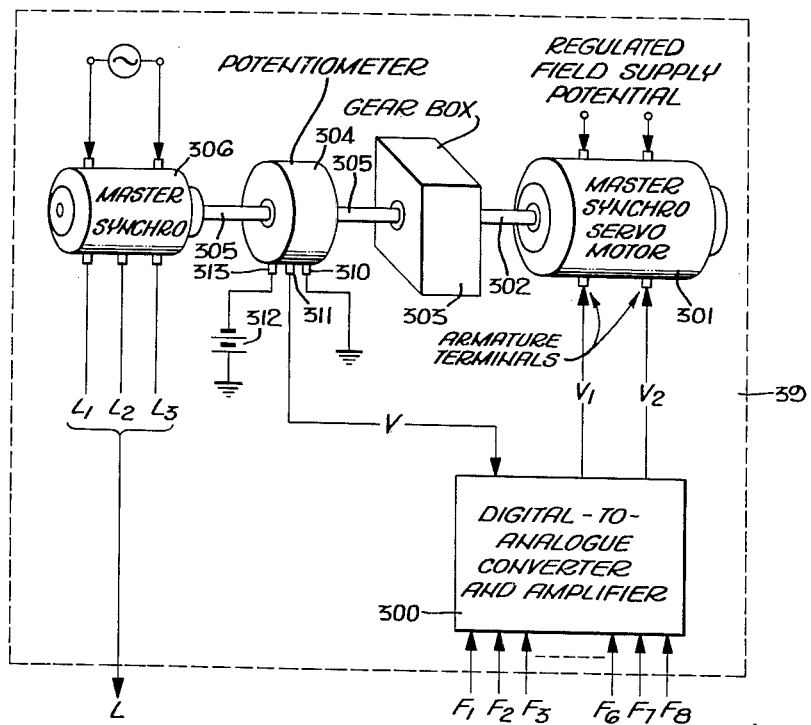
Fig. 3 is a schematic diagram, partially in block form, of the master synchro included in the system of Fig. 1.

Reference is now made to Fig. 3 wherein there is illustrated a schematic diagram partly in block form of the master synchro circuit 39 of Fig. 1, indicated by broken lines, for simultaneously receiving signal $F_1$, $F_2$, $F_3$, ... $F_6$, $F_7$, $F_8$ developed by the angle register 38 of Fig. 1 and for producing the three master synchro voltage signals $L_1$, $L_2$, and $L_3$, conveniently referred to as signals L.

As indicated in Fig. 3, the master synchro circuit 39 includes a digital-to-analogue converter and amplifier 300, a master synchro servomotor 301, a main drive shaft 302, a reduction gear box 303, a potentiometer 304, a secondary drive shaft 305, and a master synchro 306. The digital-to-analogue converter and amplifier 300, in response to signals $F_1$, $F_2$, $F_3$, ... $F_6$, $F_7$, $F_8$, and a regulating voltage signal V produced by the potentiometer 304 and obtained from terminal 311, develops a varying analogue voltage $V_1$—$V_2$. Voltage $V_1$—$V_2$ is applied to the armature winding terminals of the master synchro servomotor 301 for controlling the torque developed on its main drive shaft 302, the field winding of motor 301 being energized from a well-regulated D. C. field supply. The gear box 303 includes a set of intermeshed reduction gears to lessen the load on motor 301 resulting from the angular countertorque developed by the master synchro 306. The resistance winding of the potentiometer 304, connected to terminals 310 and 313, is stationary, and supplied with a constant current flow by a battery 312, terminal 313 being connected directly to ground and terminal 310 being returned to ground through the battery. The rotatable pointer of potentiometer 304 is coupled to the secondary drive shaft 305 and rotates therewith, the electrical connection to the pointer being to terminal 311.

As will be explained in detail later on, voltage $V_1$—$V_2$ is produced as the difference voltage of voltage V and the analogue voltage equivalent of signals $F_1$, $F_2$, $F_3$, ... $F_6$, $F_7$, $F_8$. As a result, the master synchro motor 301 will develop a torque sufficient to rotate the main drive shaft 302 and thus the secondary drive shaft 305 until the voltage V obtained from the rotating pointer of the potentiometer 304 is equal in magnitude to the analogue voltage equivalent of signals $F_1$, $F_2$, $F_3$, ... $F_6$, $F_7$, $F_8$ at which time the motor will stop. The rotor of the master synchro 306 is directly coupled to the secondary drive shaft 305 and is thus positioned in accordance with the values of signals $F_1$, $F_2$, $F_3$, ... $F_6$, $F_7$, $F_8$.

Figure 4:
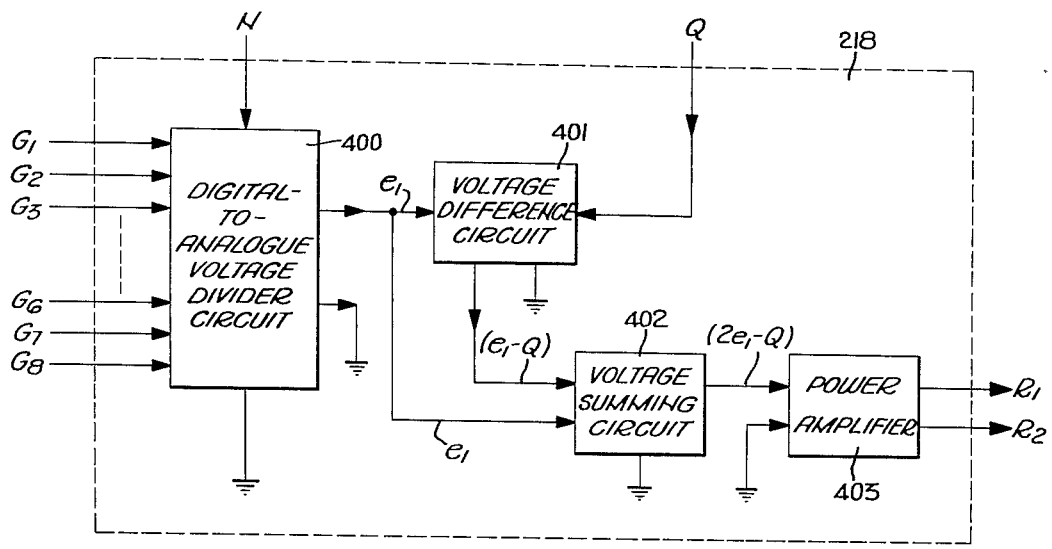
Fig. 4 is a schematic diagram, in block form, of the slide servo speed regulator forming part of the servo of Fig. 2.

Referring now to Fig. 4 there is shown a schematic block diagram of the slide servo speed regulator 218, indicated by broken lines, of Fig. 2 simultaneously responsive to servo control signals $G_1$, $G_2$, $G_3$, ... $G_6$, $G_7$, $G_8$, voltage signal N, and voltage regulator signal Q for developing servomotor control voltage $R_1$—$R_2$. The speed regulator 218 includes a digital-to-analogue voltage divider circuit 400 responsive to simultaneously applied signals $G_1$, $G_2$, $G_3$, ... $G_6$, $G_7$, $G_8$, and voltage N for developing an analogue voltage $e_1$, a voltage difference circuit 401 coupled to the divider circuit 400 and responsive to voltage $e_1$ and to signal Q for developing a difference voltage $(e_1-Q)$ equal to the algebraic difference of voltages Q and $e_1$, a voltage summing circuit 402 coupled to the divider circuit 400 and the difference circuit 401 and responsive to voltages $e_1$ and $(e_1-Q)$ for algebraically summing voltages $e_1$ and $(e_1-Q)$ to develop an output voltage $(2e_1-Q)$ which is applied to the input circuit of a power amplifier 403. Motor control voltage $R_1$—$R_2$ represents the output of the power amplifier 403 and is equal in magnitude to voltage $(2e_1-Q)$, the power amplifier 403 merely providing a low impedance source for voltage $(2e_1-Q)$.

The digital-to-analogue voltage divider circuit 400 essentially converts the digital signals $G_1$, $G_2$, $G_3$, ... $G_6$, $G_7$, $G_8$ to an analogue voltage equivalent by producing the output voltage $e_1$ as having a magnitude at any instant directly proportional to the total weighted values or decimal equivalents of input signals $G_1$, $G_2$, $G_3$, ... $G_6$, $G_7$, $G_8$. This is accomplished by using the voltage N as a reference voltage and producing the voltage $e_1$ as having a magnitude anywhere from 0 to the magnitude N in accordance with the binary values of signals $G_1$, $G_2$, $G_3$, ... $G_6$, $G_7$, $G_8$. For example, if the signals $G_1$, $G_2$, $G_3$, ... $G_6$, $G_7$, $G_8$ are simultaneously 0 level signals, representing decimal digits 00, $e_1$ will have a 0 magnitude. If, however, signals $G_1$, $G_2$, $G_3$ ... $G_6$, $G_7$, $G_8$ represent decimal digits 99, $e_1$ will be equal in magnitude to N. Between these two extremes, $e_1$ will have a magnitude proportional to the decimal equivalent of signals $G_1$, $G_2$, $G_3$, ... $G_6$, $G_7$, $G_8$. The detailed structure of the voltage divider circuit 400 will be explained in more detail hereinafter.

The voltage difference circuit 401 of Fig. 4 is a well known circuit extensively used in analogue computers for receiving two input voltages and producing an output voltage having a magnitude equal to the "algebraic" difference in magnitude of the two input voltages. The output voltage is said to represent the algebraic difference of the two input voltages because the polarity of the output voltage follows the algebraic sign of the difference function. For example, if the input voltage Q has a greater magnitude than the input voltage $e_1$, then the voltage $(e_1-Q)$, being algebraically represented by a negative sign, will have a negative polarity opposite to that of voltage $(e_1-Q)$ when the magnitude of Q is less than the magnitude of $e_1$.

The summing circuit 402 is similarly well known in the analogue computer art and is a device for algebraically adding two input voltages to produce an output voltage, input voltages of like polarity being arithmetically added and input voltages of opposite polarity being arithmetically subtracted.

Both voltage difference circuits and voltage summing circuits suitable for operation in the slide servo speed regulator 218 of Fig. 4 are discussed in detail in "Analogue Methods in Computation and Simulation by Walter W. Soroka, published by McGraw-Hill Book Co., Inc., New York, 1954, pages 41 to 44.

By adding again the difference voltage $(e_1-Q)$ to the voltage $e_1$ representing the analogue voltage equivalent of the digital signals $G_1$, $G_2$, $G_3$, ... $G_6$, $G_7$, $G_8$, a feedback correction loop is obtained for accurately regulating the amplitude of voltage $R_1-R_2$ and thus the speed of the servomotor 213 of Fig. 2.

Reference is now made to Fig. 5, showing a schematic diagram, partially in block form, of the digital-to-analogue converter and amplifier 300 shown in conjunction with a potentiometer circuit 510 including the potentiometer 304 and the battery 312 of Fig. 3, each being indicated by broken lines. The digital-to-analogue converter and amplifier 300 is simultaneously responsive to angle register signals $F_1$, $F_2$, $F_3$, ... $F_6$, $F_7$, and $F_8$ produced by the angle register 38 of Fig. 1 and to voltage signal V developed by the potentiometer circuit 510 for developing motor control voltage $V_1-V_2$. Included in the converter and amplifier 300 is a digital-to-analogue voltage divider circuit 501 responsive to signals $F_1$, $F_2$, $F_3$, ... $F_6$, $F_7$, $F_8$ and a direct-current reference potential produced by battery 506 for producing an analogue equivalent voltage $P_1$, which is applied to one input of a voltage difference circuit 502. The voltage difference circuit 502 is similar to the voltage difference circuit 401 of Fig. 4 and is coupled to the divider circuit 501 and responsive to voltage $P_1$ and to voltage V from the potentiometer 304, and produces output voltage $(P_1-V)$ equal to the algebraic difference between voltage $P_1$ and V. Voltage $(P_1-V)$ is applied to the input circuit of a power amplifier 503. The power amplifier 503, in response to voltage $(P_1-V)$, produces motor control voltage $V_1-V_2$ equal in magnitude to voltage $(P_1-V)$ but having a low output impedance.

With reference to the potentiometer circuit 510, the resistance winding 504 of potentiometer 304 is connected between output terminals 310 and 313. The pivotal axis of a pointer 511 of the potentiometer 304 is affixed to the secondary driving shaft 305 illustrated in Fig. 3. Terminal 313 is electrically connected to one terminal of battery 312, the other terminal 311 of the resistance winding 504 and the other terminal of battery 312 being connected directly to ground. The output voltage V from the potentiometer circuit 510 is derived directly from the pointer 511 of potentiometer 304.

The circuit of Fig. 5 operates in conjunction with the remainder of the master synchro circuit 39 of Fig. 3 as follows. The digital angle register signals $F_1$, $F_2$, $F_3$, ... $F_6$, $F_7$, $F_8$ are converted by the divider circuit 501 into an analogue voltage equivalent $P_1$. As is obvious, the magnitude of voltage V produced by potentiometer circuit 510 will increase from 0 to the voltage of battery 312 as the pointer 511 is rotated from its extreme clockwise to the counterclockwise position. Assuming that the position of pointer 511 and the values of signals $F_1$, $F_2$, $F_3$ ... $F_6$, $F_7$, $F_8$ are such that the voltages $P_1$ and V differ, the difference circuit 502 will develop a voltage $(P_1-V)$ which is amplified by power amplifier 503 to produce voltage $V_1-V_2$. Voltage $V_1-V_2$, which is impressed on the armature winding of motor 301 of Fig. 3, will cause motor 301 to develop a torque sufficient to rotate shaft 305 through gear box 303. As shaft 305 rotates, the pointer 511 is also rotated in a direction to change the magnitude of the voltage V in a direction which will cause voltage V to approach the value of voltage $P_1$ until the value of voltage V is equal to that of voltage $P_1$ at which time voltage $(P_1-V)$ will equal zero. The motor 301 will then stop, positioning the rotor of the master synchro 306 of Fig. 3 at a position or angle in accordance with the values of the binary signals $F_1$, $F_2$, $F_3$, ... $F_6$, $F_7$, $F_8$.

Reference is now made to Fig. 6 illustrating a schematic circuit diagram of the digital-to-analogue voltage divider circuit 501 of Fig. 5, indicated in Fig. 6 by broken lines and shown in combination with the battery 506 of Fig. 5. The voltage divider circuit 501 in response to binary-coded digital signals $F_1$, $F_2$, $F_3$, ... $F_6$, $F_7$, $F_8$ and the potential developed by battery 506 produces an output voltage $P_1$ representing the analogue voltage equivalent of signals $F_1$, $F_2$, $F_3$, $F_4$, $F_5$, $F_6$, $F_7$, $F_8$.

Included in the voltage divider circuit 501 are eight identical relay drivers 611 to 618, eight identical relays $F^r_1$ to $F^r_8$, each having a normally open and a normally closed set of contacts, and 16 precision resistors $R_1$ to $R_8$, and $R'_1$ to $R'_8$, all connected in series between the positive terminal of battery 506 and ground.

The relay drivers 611 to 618 are conventional amplifiers well known in the art for amplifying a two-level voltage signal impressed on the input of the amplifiers and producing an output voltage sufficient to energize the holding coil of the associated relay in response to a 1 level input signal and insufficient to energize the holding coil of the associated relay in response to a 0 level input signal.

Signals $F_1$ to $F_8$ are impressed on the input circuits of relay drivers 611 to 618, respectively, the outputs of which are applied to the holding coils of relays $F^r_1$ to $F^r_8$. Thus, a 1 level $F_1$ signal will cause relay $F^r_1$ to be energized, a 1 level $F_2$ signal will cause relay $F^r_2$ to be energized, and so on.

The normally closed contacts of each relay are connected in shunt across an associated one of the resistors $R_1$ to $R_8$, inclusive, and the normally open contacts of the relay shunt a corresponding one of the resistors $R'_1$ to $R'_8$, inclusive. Thus the normally closed and normally open contacts of relay $F^r_1$ shunt resistors $R_1$ and $R'_1$, respectively. Similarly, the open and closed contacts of relay $F^r_2$ shunt resistors $R_2$ and $R'_2$, respectively, and so on. The output potential of voltage divider circuit 501 is derived between ground and the common junction point of resistors $R_8$ and $R'_1$. Thus when all the relays $F^r_1$ to $F^r_8$ are de-energized, resulting from signals $F_1$ to $F_8$, being all at 0 level, all the resistors $R_1$ to $R_8$ will be shunted by the normally closed contacts of relays $F^r_1$ to $F^r_8$ and the output voltage of the circuit will be zero. When signals $F_1$ to $F_8$ are all 1 level signals, relays $F^r_1$ to $F^r{}_8$ will be energized causing resistors $R'_1$ to $R'_8$ to be short circuited and resistors $R_1$ to $R_8$ to be not bypassed resulting in the entire potential developed by battery 506 to appear across resistors $R_1$ to $R_8$, and thus on the output terminals of the circuit of the voltage divider 501.

By a proper choice of values for resistors $R_1$ to $R_8$ and $R'_1$ to $R'_8$, it is obvious that the output voltage of the voltage divider 501 may have a magnitude at any instant equal to the analogue equivalent of the total weight of the binary-coded digital signals $F_1$ to $F_8$.

Digital-to-analogue divider circuits of the above general class are fully described in an article entitled "Networks for digital-to-analogue shaft position transducers," by S. J. O'Neil, in Communications and Electronics, published by the AIEE, November 1954, pages 456 to 466.

The digital-to-analogue voltage divider circuit 400 included in the slide servo speed regulator 218 illustrated in Fig. 4 is similar to the digital-to-analogue divider circuit 501 of Fig. 6 described above, with the exception that voltage N is substituted for the battery and signals $G_1$ to $G_8$ are substituted for signals $F_1$ to $F_8$.

In order to provide a better understanding of the overall operation of the automatic digital control system described and illustrated in the figures, the operation of the system of the invention in the execution of a set of three orders for controlling a typical cutting motion of the turret slide will now be considered. The first order includes an order number section, a speed/angle instruction section and a timing instruction section and controls the initial starting time and velocity of travel of the turret slide. The first order is recorded on the first, or extreme right hand channel of drum 3 in the memory circuit 10. The second order including again three order sections and controlling the angle at which the master synchro is to be set is entered in the next channel to the left; and the third order, controlling the time at which the master synchro is connected to the turret slide servo in order to stop the turret slide, is recorded on the third channel of drum 3.

To execute the orders recorded on the drum 3, the first order is serially transferred, by the drum reading sequence circuit 5, to the order register 31, the speed/angle register 32, and the timing register 33. At the end of the transfer operation, the order number section, the speed/angle instruction section, and the timing instruction section of the first order are stored in the order register 31, the speed/angle register 32, and the timing register 33, respectively.

Signals B representing the speed/angle instruction section of the order are gated by the switching circuit 34, in response to signals A representing the order number section of the order, to the turret slide speed register 35, where the binary digits represented by signals A are stored. The turret slide speed register 35 produces binary signals $G^t$ which are impressed on the turret slide servo 81.

The timing register 33 produces signals $C_1$ to $C_{16}$ which are impressed on the comparator 27. Signals $D_1$ to $D_{16}$ representing the accumulated count of the counter 26, which in turn indicates the total number of revolutions of the machine tool spindle 29, are also impressed on the comparator 27. The comparator 27 produces a 1 level timing signal T when the total binary-coded decimal weights of signals $C_1$ to $C_{16}$ and signals $D_1$ to $D_{16}$ are equal. The 1 level T signal is routed by the timing signal switching circuit 28, in response to the order number signals A to the turret slide servo 81 as signals $T^t$.

Voltage N, produced by the capacitor-commutator 88 is also impressed on the turret slide servo 81.

With reference to Fig. 2, signals $G^t$ from the turret slide speed register 35 of Fig. 1, are entered into the slide servo speed regulator 218 which develops the voltage $R_1 - R_2$ as the analogue voltage equivalent of the digit signals $G^t$. The voltage $R_1 - R_2$ is impressed on the armature winding of motor 213 thus initiating rotation thereof. The voltage Q, developed by the capacitor-commutator 214 is compared with the voltage N in the slide servo speed regulator 218 for producing an error voltage which is algebraically added to voltage $R_1 - R_2$.

The timing signal $T^t$ is applied to the input of flip-flop K' through inverter 222 triggering it to its 1 state, thus causing relay 221 to be energized by amplifier 220. Energization of relay 221 causes the magnetic clutch 215 to be energized by D. C. current from the battery 220 through the normally open contacts of relay 221 and terminals 3 and 4 thus coupling the servo slide shaft 210 to the rotating motor 213. The rotation of shaft 210 causes turret slide 200 to move in a forward direction as indicated by arrow F at a speed determined by the speed instruction section of the first order.

With reference to Fig. 1, the second order is now read from the second channel of the drum 3 and transferred to registers 31, 32, and 33. The register signals $C_1$ to $C_{16}$ are again compared with signals $D_1$ to $D_{16}$ obtained from the counter 26 and when coincidence occurs, a 1 level signal T is produced by the comparator 26. Signal T is gated, in response to signals A, by the timing signal switching circuit 28 to the angle register 38 in the form of signals $T^m$.

Signals B developed by the speed/angle register 32 are gated, by the switching circuit 34 in response to signals A to the angle register 38.

In response to signals $T^m$, the angle register 38 produces signals $F_1$ to $F_8$, representing the speed/angle instruction section of the order, which are applied to the master synchro 39.

With reference to Fig. 3, signals $F_1$ to $F_8$ are impressed on the digital-to-analogue converter and amplifier circuit 300 of the master synchro circuit 39, which develops a voltage $P_1$ that is compared with voltage V from the potentiometer 304, the difference voltage $V_1 - V_2$ being applied to the armature winding of motor 301. The rotor of motor 301 thus starts rotating, causing rotation of the pointer of potentiometer 304 and of the rotor of the master synchro 306. As the pointer of the potentiometer rotates, voltage V approaches the value of the voltage $P_1$ developed within converter-amplifier 300 until they are equal, resulting in voltage $V_1 - V_2$ dropping to zero thereby stopping the motor and positioning master synchro 306.

Returning to Fig. 1, the third order is now transferred from the drum to registers 31, 32, and 33. The output signals $C_1$ to $C_{16}$ from timing register 33 are again compared with signals $D_1$ to $D_{16}$ produced by counter 26, and when coincidence occurs, the 1 level signal T is switched by the switching circuit 28 to the turret slide servo 81 as signal $T^t$. The third order does not contain a speed/angle instruction section, speed/angle register 32 storing only 0's, therefore this section of the third order need not be considered.

With reference to Fig. 2, signal $T^t$ causes flip-flop K', previously in the true or 1 state, to be triggered to the 0 or false state. As a result relay 221 is de-energized. De-energizing of relay 221 disconnects the D. C. winding of the magnetic clutch 215 from battery 230 and at the same time energizes the A. C. winding of the clutch by the A. C. current flowing through the back-to-back three phase Y field windings of the slide synchro 217 and the master synchro 306 of Fig. 3 by means of signals $L^t$. This current will be sustained until the slide synchro 217 is angularly aligned with the master synchro setting, at which time the current falls substantially to zero thus causing magnetic clutch 215 to be de-energized. The de-energization of magnetic clutch 215 decouples shaft 212 from shaft 216 thus stopping the slide 200 at the desired stopping point.

From the foregoing discussion, it is apparent that the present invention provides an automatic digital control system for controlling a machine tool in response to a group of orders in digital form, the machine tool performing each controlled operation in response to a separate order included in the order group. Each controlled operation of the machine is timed with reference to the motion of a single, continuously moving, part of the machine, as for example the main drive shaft. To this end a timing instruction for each operation of the machine is included in the order group. The order group is originated by a programmer who programs the orders to allow sufficient time for completion of each controlled operation of the machine before the succeeding order becomes effective.

The automatic digital control system of the present invention as described comprises a memory circuit for storing an entire group of orders sufficient for controlling a complete operational period of the controlled machine, a sequence circuit for separating the individual instructions of each order and switching each of the separated instructions to an associated servo mechanism for performing the desired operation, a timing circuit for comparing the timing instructions of each order with the total reference counts or motions of the main drive shaft of the machine for producing an individual timing signal for each of the servo mechanisms, and separate servo mechanisms for each automatically controlled operation of the machine.

It has been further shown that an automatic digital control system in accordance with the present invention is much simpler than conventional digital-servo loop systems in which a separate digital servo loop is provided for each mechanical operation controlled by the digital control system. Unlike the digital-servo loop systems of the prior art, the automatic digital control system of the present invention requires but a single servo loop for controlling a plurality of mechanical operations within the machine, each operation being performed sequentially, and referenced in time to a single moving reference component of the machine such as the drive shaft thereof.

An embodiment of the automatic digital control system of the present invention adapted for controlling a Brown and Sharpe automatic screw machine in response to a group of orders in binary-coded digital signal form has been illustrated. The illustrated embodiment of the automatic digital control system has been described as capable of automatically controlling, during each operational cycle of an operational period of the machine, the turret slide, the back-cross slide, the front-cross slide, the forward-reverse mechanism, the deflector mechanism, the turret index mechanism, and the stock feed mechanism, in response to a group of orders. The main spindle or drive shaft of the screw machine is used as a time-reference for indexing or referencing the automatic operation of each of the above mechanisms of the machine. This is accomplished by counting the total number of revolutions of the spindle shaft during each operational cycle of the machine, the timing instructions of each order being compared with the total count of spindle revolutions for developing a timing signal each time the numerical value of a timing instruction is equal to the total number of spindle revolutions.

Although the embodiment of the present invention herein described is adapted for operation in response to binary-coded decimal order signals, it should be apparent that the present invention is not so limited but is equally operable in response to binary, or binary-coded number system orders, such as binary-coded octal or binary-coded biquinary signals.

Although the present invention has been described in relation to binary electrical signal pulses, it should be apparent that the principles herein taught are equally applicable to any two-condition signal system such as mark-space, symmetrical wave, or carrier modulation systems.

The embodiments herein described utilize electrical signals, electrical gating circuits, and electronic flip-flops, but it should be clearly understood that the principles of the invention are equally applicable to electro-mechanical, mechanical, hydraulic, or chemical devices having similar gating features, two stable states, and storage capacity or memory.

What is claimed as new is:

1. An automatic digital control system for automatically controlling mechanical motions of a tool of a tool machine in response to an order group, each order including at least two order sections of an order number section, a speed/angle instruction section, and a timing instruction section represented, respectively, by order number, speed/angle, and timing instruction binary electrical signals, the timing instruction section of each order indicating the time of execution of the order and time-referenced in a manner to allow sufficient time for the execution of the order before the execution of any other order of the order group, each order being time-referenced to an incremental motion of a selected moving part of the tool machine; said control system comprising: first means for storing an order group and for reproducing each order of the order group in a sequenital manner, each order being produced by said first means after the execution of the immediately preceding order; second means for developing counting binary signals in response to incremental motions of the selected moving part of the machine; third means coupled to said first and second means for receiving the order number and timing instruction signals of each order produced by said first means, for comparing said counting binary signals with said timing instruction signals producing a time-reference signal each time a coincidence occurs between said counting binary signals and timing instruction signals, and for combining said timing signals with said order signals for producing a plurality of control timing signals; and fourth means coupled to said first and third means and responsive to said order number signals and said speed/angle signals produced by said first means, and said timing instruction signals produced by said third means for automatically controlling the motions of the tool of the machine.

2. An automatic digital control system for automatically controlling a plurality of operations of a machine tool, in response to a group of orders, each order including at least two order sections of an order number section, a speed/angle section, and a timing section, represented, respectively by order number, speed/angle, and timing instruction binary electrical signals, each controlled operation of the machine being time-referenced with respect to the incremental motion of a selected moving component of the machine and each controlled operation being sequentially executed in response to the timing instruction section of a corresponding order; said control system comprising: a memory circuit for storing an order group and for reproducing, in a sequential manner, each order of said order group; a sequence circuit coupled to said memory circuit and responsive to the order number and speed/angle signals of each order reproduced by said memory circuit for developing control signals; a timing circuit coupled to said memory circuit for receiving the order number and timing instruction signals of each order reproduced by said memory circuit for developing timing signals, said timing circuit including analogue-to-digital conversion means for producing digital electrical signals in response to incremental motions of the moving part of the machine, and further including a comparator for comparing said timing instruction signals with said digital electrical signals and producing said timing signals; and a servo circuit coupled to said sequence circuit and to said timing circuit and responsive to the control signals produced by said sequence circuit and the timing signals produced by said timing circuit for controlling in response to said control signals, the controlled operations of the machine at spaced time intervals determined by said timing signals.

3. The automatic digital control system defined in claim 2 wherein said servo circuit includes a separate servo mechanism for each automatically controlled operation of the machine tool, and wherein said timing signals developed by said timing circiut include a plurality of timing control signals, each of said timing control signals being developed for one of said servo mechanisms.

4. The automatic digital control system defined in claim 3 wherein said timing circuit includes a switching circuit coupled to said comparator and responsive to the timing signals produced by said comparator and to said order signals for selectively gating said timing signals in response to the order signals to directly develop said timing control signals from said timing signals.

5. The automatic digital control system defined in claim 3 wherein said control signals produced by said sequence circuit include a plurality of servo control signals, each of said servo control signals being associated with a corresponding one of said servo control mechanisms, and wherein said sequenec circuit includes a switching circuit responsive to the order and the speed/angle signals produced by said memory circuit for selectively gating said speed/angle signals in accordance with said order signals to directly produce said servo control signals from said speed/angle signals.

6. The automatic digital control system defined in claim 2 wherein said analogue-to-digital conversion means includes a pulse producing circuit coupled to the selected moving part of the controlled machine for producing an electrical pulse upon each incremental motion of said moving part, and further includes a counter coupled to said pulse producing circuit and responsive to said electrical pulses for counting the electrical pulses and producing said digital electrical signals representing the accumulated count of said counter.

7. An automatic digital control system for automatically controlling operations of an automatic screw machine for each operational cycle of an operational period of the machine in response to a group of orders in the form of binary electrical signals, the performance time of each operation being referenced to incremental motions of a selected moving structure of the screw machine, each order including at least two order sections of an order number section, a speed/angle section, and a timing section represented, respectively, by order number, speed/angle, and timing instruction signals, the timing instruction signals indicating the performance time; said control system comprising: a memory circuit for receiving a group of orders and reproducing, during each operational cycle of the screw machine, each order of the order group; a timing circuit coupled to said memory circuit and responsive to the order number and timing instruction signals of each order reproduced by said memory circuit for developing timing and timing control signals; a sequence circuit coupled to said memory circuit and said timing circuit and responsive to the order number and speed/angle signals of each order reproduced by the memory circuit and said timing control signals produced by the timing circuit for producing sequence control signals; and a servo circuit coupled to said timing circuit and sequence circuit and responsive to said timing control and sequence control signals for controlling the operations of the machine.

8. The automatic digital control system defined in claim 7 wherein said memory circuit reproduces the order group during each operational cycle in a sequential manner, each order being reproduced by the memory circuit coincident in time with the commencement of execution of the preceding order reproduced by the memory circuit, and wherein said memory circuit includes a permanent storage medium for permanently recording the binary signals of the order group thereon, and a reproducing circuit responsive to the timing signals developed by said timing circuit for sequentially reproducing the order group, each order being reproduced in response to a timing signal.

9. The automatic digital control signal defined in claim 8 wherein said servo circuit includes a plurality of servo mechanisms, one servo mechanism for each separately controlled operation of the screw machine, and wherein the timing control signals produced by said timing circuit include a corresponding plurality of servo timing signals, one of said servo timing signals being produced for each servo mechanism.

10. The automatic digital control system defined in claim 9 wherein the sequence control signals produced by said sequence circuit include a plurality of servo control signals, each of said servo control signals being associated with a corresponding one of said servo mechanisms, and wherein said sequence circuit includes switching means responsive to order number and speed/angle instruction signals for gating said speed/angle signals in accordance with said order signals, to directly develop said servo control signals.

11. The automatic digital control system defined in claim 10 wherein said switching means includes an order, a speed/angle, and a timing shifting register for receiving each order produced by said memory circuit and for developing order register signals, timing register signals, and said timing instruction signals and wherein said switching means includes a plurality of static registers and a switching circuit coupled to said static registers and said order and speed/angle shifting registers, said switching circuit being responsive to said order register and speed/angle instruction signals for selectively transferring said speed/angle signals in accordance with said order signals to said static registers, each of said static registers producing a corresponding one of said servo control signals.

12. The automatic digital control system defined in claim 11 wherein said sequence control signals further include a plurality of synchro control signals, each of said synchro control signals being produced for one of said servo control signals and associated with a corresponding one of said servo control mechanisms included in said servo circuit, and wherein said sequence circuit further includes an angle register coupled to said switching means, a master synchro coupled to said angle register, and a synchro switching circuit coupled to said master synchro, said angle register being responsive to the speed/angle signals gated by said switching circuit and to the timing signals developed by said timing circuit for developing angle register signals, said master synchro being responsive to said angle register signals for producing synchro voltages, and said synchro switching circuit being responsive to said synchro voltages and the order signals for selectively gating said synchro voltages to directly produce said synchro control signals.

13. The automatic digital control system defined in claim 12 wherein said timing circuit includes digital-to-analogue conversion means for developing electrical pulses in response to incremental motions of the selected moving structure of the screw machine, a counter for counting said pulses and producing count signals representing the accumulated count of the counter, a comparator coupled to said counter and responsive to said count signals and said timing instruction signals for comparing said signals and producing timing signals when the count signals and the timing instruction signals are equal, and a timing switching circuit coupled to said comparator circuit and responsive to said timing signals and said order signals for selectively switching said timing signals to directly develop said timing control signals from said timing signals.

14. The automatic digital control system defined in claim 13 wherein said storage medium is a magnetic drum having a plurality of separate memory channels, each storing a corresponding one of the orders included in said order group, and wherein said reproducing means is a drum reading sequence circuit responsive to said timing signals produced by said timing circuit for successively reading and reproducing the signals stored on each of said memory channels.

15. An automatic digital control system for automatically controlling the turret slide, back-cross slide, front-cross slide, forward-reverse trip mechanism, deflector trip mechanism, turret index trip mechanism, and stock feed trip mechanism of an automatic screw machine during each operational sycle of an operational period in response to an order group comprised of separate binary-coded orders, each order including at least two order number signals, speed/angle signals, and timing instruction signals, said control system comprising: a memory apparatus for storing order groups and sequentially reproducing, in response to timing signals, each order of an order group during each operational cycle of the operational period; a sequence circuit coupled to said memory apparatus and responsive to the order number and speed/angle signals of each order reproduced by the memory apparatus and responsive to said timing signals for producing turret slide control signals, back-cross slide control signals, and front-cross slide control signals; a timing circuit coupled to said memory apparatus and said sequence circuit and responsive to the timing instruction signals reproduced by said memory apparatus for producing said timing signals, said timing circuit including means for counting incremental motions of a selected moving part of the screw machine and comparing said count with the timing instruction signals of each order; and a servo circuit coupled to said timing circuit and to said sequence circuit and including a turret slide servo, a back-cross slide servo, a front-cross slide servo, a forward-reverse trip solenoid, a deflector trip solenoid, a turret index trip solenoid, a stock feed trip solenoid, and a voltage generator, said voltage generator being coupled to the moving part of the machine and producing a voltage output proportional to the speed of motion of the moving part, each of said solenoids being responsive to said timing signals for controlling the corresponding operation of the machine, said turret slide servo, said back-cross slide servo, and said front-cross slide servo being responsive, respectively, to said turret slide servo control signals, said back-cross servo control signals, and said front-cross slide servo control signals, and each of said servos being responsive to said timing signals and said voltage output, for controlling automatically the operation of the turret slide, the back-cross slide and the front-cross slide, respectively, of the machine.

16. The automatic digital control system defined in claim 15 wherein said sequence circuit includes a master synchro, and wherein each of said servos includes a slave spnchro, each of said slave servos being electrically connected to said master synchro in accordance with a corresponding one of said control signals during each automatically controlled operation of the corresponding slide of the machine.

17. The automatic digital control system defined in claim 16 wherein said selected moving part is the main spindle of the screw machine, and wherein said counting means is an electrical pickup mounted in close proximity to said main spindle of the machine for producing a pulse in response to each revolution of said spindle, and a counter coupled to said pickup and responsive to said pulses for counting said pulses and producing binary output signals representing the accumulated spindle revolutions during each operational cycle of the machine.

18. An automatic digital control system for automatically controlling the ratio of the speed of a first and a second moving part of a machine in response to a group of weighed binary electrical signals, where the first moving part is continuously moving at a fixed speed and wherein the velocity of motion of the second moving part is varied in response to the group of weighted binary electrical signals, said system comprising: a first voltage generator coupled to the first moving part and developing a first voltage output N having an amplitude proportional at any instant to the velocity of the first moving part; a second voltage generator coupled to the second moving part and generating a second output voltage Q proportional to the velocity of the second moving part; a digital-to-analogue voltage divider circuit coupled to said first voltage generator and responsive to the group of weighted binary signals for producing an output potential $e_1$ proportional to the sum of the total weight represented by said weighted binary signals, said potential $e_1$ having a maximum possible amplitude of N and a minimum possible amplitude of 0; a voltage difference circuit coupled to said voltage divider circuit and responsive to said voltages $e_1$ and Q for developing a difference voltage $(e_1-Q)$ equal to the algebraic difference of voltages $e_1$ and Q; and a voltage summing circuit coupled to said voltage difference circuit and said voltage divider and responsive to voltages $(e_1-Q)$ and $e_1$ for developing a sum voltage $(2e_1-Q)$ representing the algebraic sum of said voltages $(e_1-Q)$ and $e_1$, said voltage $(2e_1-Q)$ being applied to the second moving part to provide the driving potential thereof.

19. An automatic digital control system for remotely controlling the stopping point of a rotatable member rotated by a constant-field-strength direct-current motor, the stopping point of said rotatable member being determined by a group of weighted binary electrical signals to stop said member at a desired angular position; said control system comprising: a potentiometer having a fixed resistor energized from a constant current supply, and a rotatable pointer affixed to the rotatable member and rotating therewith, said rotatable pointer providing voltage V having an amplitude varying directly with the angular position of the pointer; a digital-to-analogue divider circuit responsive to the group of weighted binary electrical signals for converting the group of weighted binary electrical signals to an analogue voltage $P_1$ proportional in amplitude to the total weighted count of the group of binary signals; and a voltage difference circuit coupled to said digital-to-analogue divider circuit and said potentiometer and responsive to said voltage $P_1$ and responsive to said voltage V for producing a difference voltage $(P_1-V)$, said voltage $(P_1-V)$ being applied to the armature winding of the motor causing the motor to rotate until the angular position of said pointer is such to produce a voltage V equal to $P_1$ at which time voltage $(P_1-V)$ is substantially zero, thus determining the stopping point of the rotatable member.

References Cited in the file of this patent

UNITED STATES PATENTS

| | | |
|---|---|---|
| 1,849,642 | Schenker | Mar. 15, 1932 |
| 2,484,968 | Sponaugle | Oct. 18, 1949 |
| 2,536,916 | Dickinson | Jan. 2, 1951 |
| 2,537,427 | Seid et al. | Jan. 9, 1951 |
| 2,656,106 | Stabler | Oct. 20, 1953 |
| 2,672,067 | Hansell | Mar. 16, 1954 |